July 30, 1940.  T. V. MOORE  2,209,534
METHOD FOR PRODUCING GAS WELLS
Filed Oct. 6, 1937
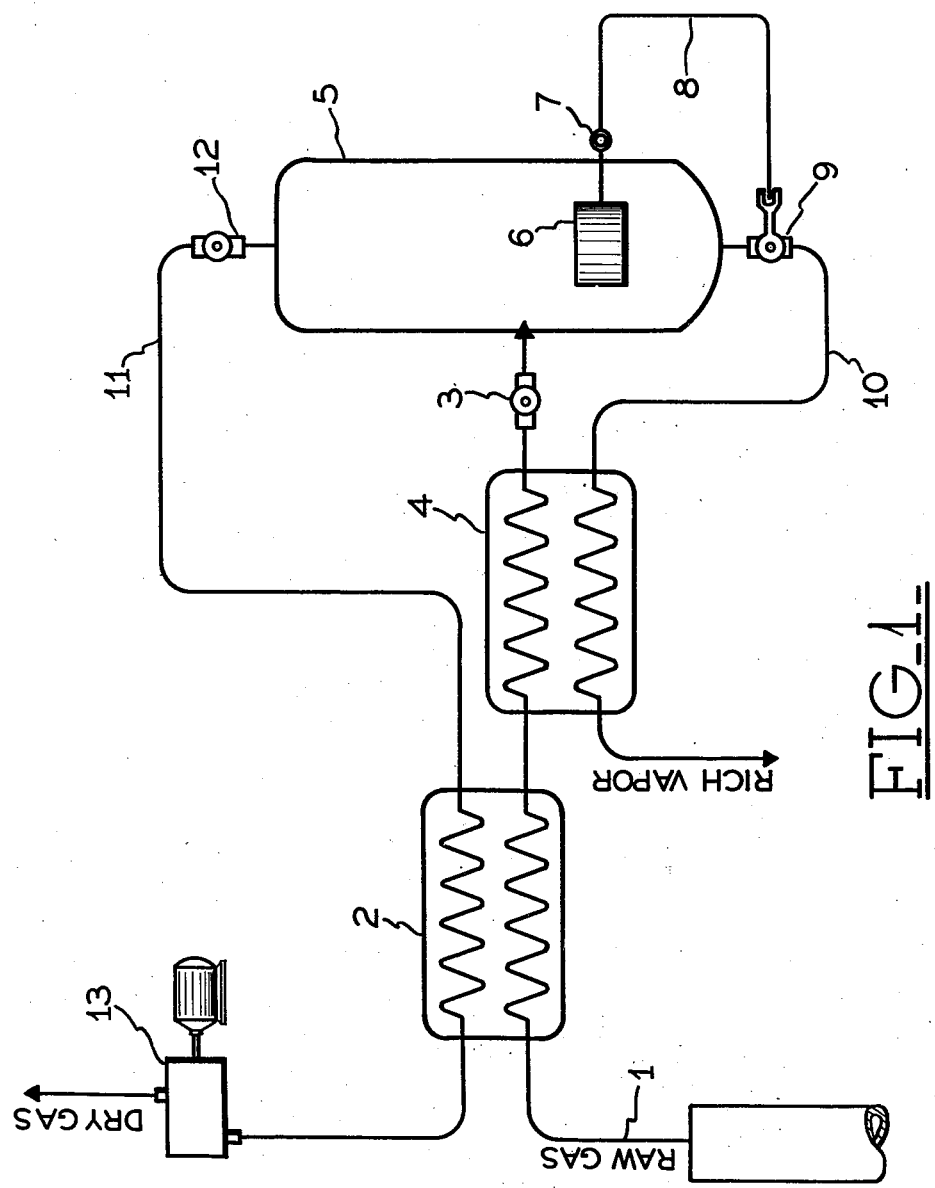
Thomas V. Moore INVENTOR.
BY P. L. Young ATTORNEY.

Patented July 30, 1940

2,209,534

UNITED STATES PATENT OFFICE 2,209,534

METHOD FOR PRODUCING GAS WELLS

Thomas V. Moore, Houston, Tex., assignor to Standard Oil Development Company, a corporation of Delaware Application October 6, 1937, Serial No. 167,560

3 Claims. (Cl. 62—175.5)

The present invention is directed to a method and apparatus for separating liquifiable constituents from mixtures thereof with gas. It is particularly applicable to the recovery of gasoline constituents from natural gas. Many natural gas wells, particularly those associated with oil deposits, yield a hydrocarbon gas under high pressure ranging upwardly from 1000 lbs. per sq. in., which contains liquifiable constituents such as propane, butane, pentane, etc. It is often desirable to return such gas to the gas reservoir under substantially the same pressure under which it is produced, such as when oil is being produced under gas drive. It is an object of the present invention to provide a method and apparatus by the employment of which valuable gasoline constituents can be recovered from such gases without causing a costly drop in the gas pressure.

Again, it is usually necessary to supply a dry gas for domestic or industrial consumption. It is a further object of the present invention to provide a method and apparatus for drying a hydrocarbon gas which is available in a high pressure supply in a simple and inexpensive manner.

Further objects and advantages of the present invention will appear from the following detailed description of the accompanying drawing in which the single figure is a front elevation in diagrammatic form of the apparatus suitable for carrying out the method of the present invention.

Referring to the drawing in detail, a pipe I conducts a wet gas from a gas well or other high pressure source, through a heat exchanger 2, a pressure release valve 3 and a heat exchanger 4 to a separator 5. The separator is provided with a conventional liquid level control comprising a float 6 pivoted at 7 and connected by a lever 8 to a pressure release valve 9 in a line 10. Line 10 is arranged so as to conduct liquid from the bottom of chamber 5 through heat exchanger 4 to a liquid recovery plant not shown. At the upper end of chamber 5 is a gas outlet line 11 provided with a pressure release valve 12 and arranged so as to conduct cold dry gas through heat exchanger 2 to pump 13 which forces the dry gas back into the well or through a transmission line, as the case may be.

In carrying out the method of the present invention in the above described apparatus, wet gas under a pressure of 1000 lbs. per sq. in. or more, is passed through line 1. Valve 3 may be adjusted so as to cause a drop in pressure or not, as may be desired, the use of this valve simply controlling the volume of fluid passing through the system during this step. Valve 9 is closed and valve 12 is open. Thus the wet gas is expanded from high pressure to atmospheric pressure or to a lower pressure above atmospheric, such as 500–800 # sq. in., thereby producing a strong refrigerating effect.

The cool gas leaving separator 5 through line 11 extracts heat from the feed gas in heat exchanger 2, and, thereby, causes the refrigerating effect to become progressively greater until the liquid constituents of the feed gas condense and collect in separator 5.

When sufficient liquid collects in separator 5 to bring the float control valve 9 into operation, valve 12 is adjusted so as to permit no more drop in pressure through the system than that required to overcome the pressure loss due to frictional flow through the system and that caused by the removal of liquid from vessel 5. This causes gas under pressure to build up in separator 5. The effect of this pressure on the liquid passing through pressure release valve 9 is to cause the liquid to expand and evaporate, thereby producing a refrigerating effect. This refrigeration is applied to the incoming gas in heat exchanger 4. At the same time cold gas is precooling the feed gas in heat exchanger 2. The combined effect of the two heat exchangers is to cause the condensation of the liquid constituents of the gas.

Thus it can be seen that when the system is in equilibrium, liquid constituents are continuously withdrawn from chamber 5 through line 10 and cold gas is constantly passing through line 11. The refrigerating effect of the evaporating liquid combined with the precooling effect of the dry gas makes it possible to separate the liquifiable constituents from the feed gas without substantially reducing its pressure. It is to be understood, however, that a certain amount of pressure drop is usually allowable, particularly in the case of gas fed to supply lines for domestic use. This pressure drop can be permitted to occur through valve 3 or through valve 12. If a pressure drop greater than that required to overcome the frictional flow through the system is allowable, it is generally more satisfactory to allow the expansion to take place through valve 3 in order to allow the maximum amount of cooling to take place before the liquid and gaseous constituents are separated from each other as well as to allow the use of the relatively large volume of vessel 5 for the expansion of the gases. In either case, the cooling effect due to this pressure drop is imparted to the feed gas.

In general it may be stated that the pressure drop occurring in the drying of the gas varies inversely with the initial content of liquifiable constituents in the gas. When sufficient liquid is collected in separator 5 the refrigerating action of the expansion of this liquid under high pressure to a vapor at atmospheric pressure is sufficient to cause the condensation of the liquifiable constituents of the feed gas without making reliance on the Jule-Thompson effect necessary.

Various modifications within the scope of the present invention are apparent from the foregoing disclosures. The present invention is not to be limited by the above description which is given for the purpose of illustration, but only by the accompanying claims in which it is intended to claim all novelty inherent in the disclosure as broadly as the prior art permits.

I claim:

1. A method for recovering liquid products from a gas held under pressure and containing wet and dry fractions, while maintaining the gas substantially at its initial pressure which comprises passing said gas mixture under pressure through a conduit into an enlarged chamber, releasing the pressure on said gas mixture in said chamber whereby the temperature of the gas mixture is lowered, passing the resulting cooler gas into indirect heat exchange relation with the initial gas mixture while the latter is still under pressure, continuing this operation until the temperature of the gas mixture in the enlarged chamber is reduced to the condensation point of the wet fraction thereof and a substantial portion of said fraction has collected in said enlarged chamber, building up above said collected fraction a blanket of gas at substantially the same pressure as the initial gas mixture, expanding said liquid fraction from said chamber under the pressure of the gas to a lower pressure, passing said expanded fraction into heat exchange relation with said wet gas mixture before the latter reaches the enlarged chamber and withdrawing high pressure gas from said enlarged chamber.

2. A method for maintaining pressure in a gas reservoir containing a gas having wet and dry fractions while recovering the wet fractions from said gas which comprises withdrawing wet gas from said reservoir, passing said gas through a conduit, initially expanding said gas to a lower pressure thereby reducing the temperature of said gas, passing the cooler gas into heat exchange relation with the wet gas while the latter is still under its initial pressure, continuing this operation until the temperature of the wet gas is reduced to the liquefaction point of the wet fraction thereof, collecting said wet fraction in a liquid state under the pressure of the gas, discontinuing the expansion of the gas, expanding said liquid fraction from the pressure of the gas to a lower pressure, effecting heat exchange relation between said expanded fraction and the wet gas while the latter is under pressure to effect the condensation from the latter of the wet fraction thereof, withdrawing dry gas under pressure from the system and returning said dry gas to the gas reservoir.

3. A method for maintaining pressure in a gas reservoir containing a gas having wet and dry fractions, while recovering the wet fractions from such gas, which comprises withdrawing wet gas from said reservoir, passing said gas through a plurality of heat exchanging zones arranged in series to an enlarged chamber, initially expanding said gas into said enlarged chamber, thereby reducing the temperature of said gas, passing the cooler gas into heat exchange relation with the wet gas while the latter is still under its initial pressure in a heat exchanging zone which is removed from said enlarged chamber, continuing this operation until the temperature of the wet gas is reduced to the liquefaction point of the wet fraction thereof, collecting said wet fraction in the liquid state in said enlarged chamber until a predetermined amount thereof is collected, discontinuing the expansion of said gas into said enlarged chamber, while continuing to feed wet gas under pressure into said chamber, thereby building up a blanket of gas over the collected liquid fraction in said chamber at a pressure substantially the same as the pressure in the gas reservoir, expanding said liquid fraction from said chamber under the pressure of said blanket of gas to a lower pressure, passing said expanded fraction into heat exchange relation with the wet gas, while the latter is under pressure, in a heat exchange zone adjacent the enlarged chamber to effect the condensation from said wet gas of the wet fraction thereof, withdrawing dry gas from said enlarged chamber substantially under the pressure of the gas reservoir, and returning said dry gas to the reservoir.

THOMAS V. MOORE.